(12) United States Patent
Potz et al.

(10) Patent No.: US 6,834,209 B2
(45) Date of Patent: Dec. 21, 2004

(54) APPARATUS AND METHOD FOR GENERATING A HUMAN MACHINE INTERFACE

(75) Inventors: Andreas Potz, Erlangen (DE); Martin Kiesel, Poxdorf (DE); Georg Trummer, Amberg (DE); Peter Wagner, Hersbruck (DE)

(73) Assignee: Siemens Aktiengesellschaft, Munich (DE)

( * ) Notice: Subject to any disclaimer, the term of this patent is extended or adjusted under 35 U.S.C. 154(b) by 57 days.

(21) Appl. No.: 09/965,603

(22) Filed: Sep. 27, 2001

(65) Prior Publication Data

US 2002/0116684 A1 Aug. 22, 2002

(30) Foreign Application Priority Data

Feb. 16, 2001 (DE) .......................................... 101 07 779
Jun. 20, 2001 (DE) .......................................... 101 29 564

(51) Int. Cl.⁷ ............................................. G06F 19/00
(52) U.S. Cl. ........................................ 700/97; 700/117
(58) Field of Search ............................. 700/96, 97, 17, 700/83, 117

(56) References Cited

U.S. PATENT DOCUMENTS

| | | | |
|---|---|---|---|
| 5,812,394 A | 9/1998 | Lewis et al. ................. 364/146 |
| 6,002,395 A | * 12/1999 | Wagner et al. ............... 345/763 |
| 6,167,406 A | * 12/2000 | Hoskins et al. .............. 707/102 |
| 6,268,853 B1 | * 7/2001 | Hoskins et al. ............... 700/83 |
| 6,449,587 B1 | * 9/2002 | Jungst ............................ 703/1 |
| 6,556,950 B1 | * 4/2003 | Schwenke et al. ........... 702/183 |
| 2004/0030460 A1 | * 2/2004 | Bergmann et al. .............. 701/1 |

FOREIGN PATENT DOCUMENTS

| | | | | |
|---|---|---|---|---|
| DE | 196 30 415 | 1/1998 | ........... G05B/19/05 |
| DE | 198 53 205 | 6/2000 | ........... G05B/15/02 |
| DE | 199 04 331 | 8/2000 | ........... H04L/29/06 |
| JP | 2000056813 | 2/2000 | ........... G05B/19/02 |

\* cited by examiner

*Primary Examiner*—Albert W. Paladini
*Assistant Examiner*—Ryan A. Jarrett
(74) *Attorney, Agent, or Firm*—Baker Botts L.L.P.

(57) ABSTRACT

In order to simplify the HMI design of HMI surfaces for operating and observing automation components with the aid of an HMI unit, HMI data are derived directly from the engineering process. The generation of relevant HMI data is therefore integrated in the operation for commissioning, designing and programming an automation component such that HMI information is also generated by simple operating actions or in an automated fashion in normal engineering.

14 Claims, 2 Drawing Sheets

APPARATUS AND METHOD FOR GENERATING A HUMAN MACHINE INTERFACE

FIELD OF THE INVENTION

Figure 1:
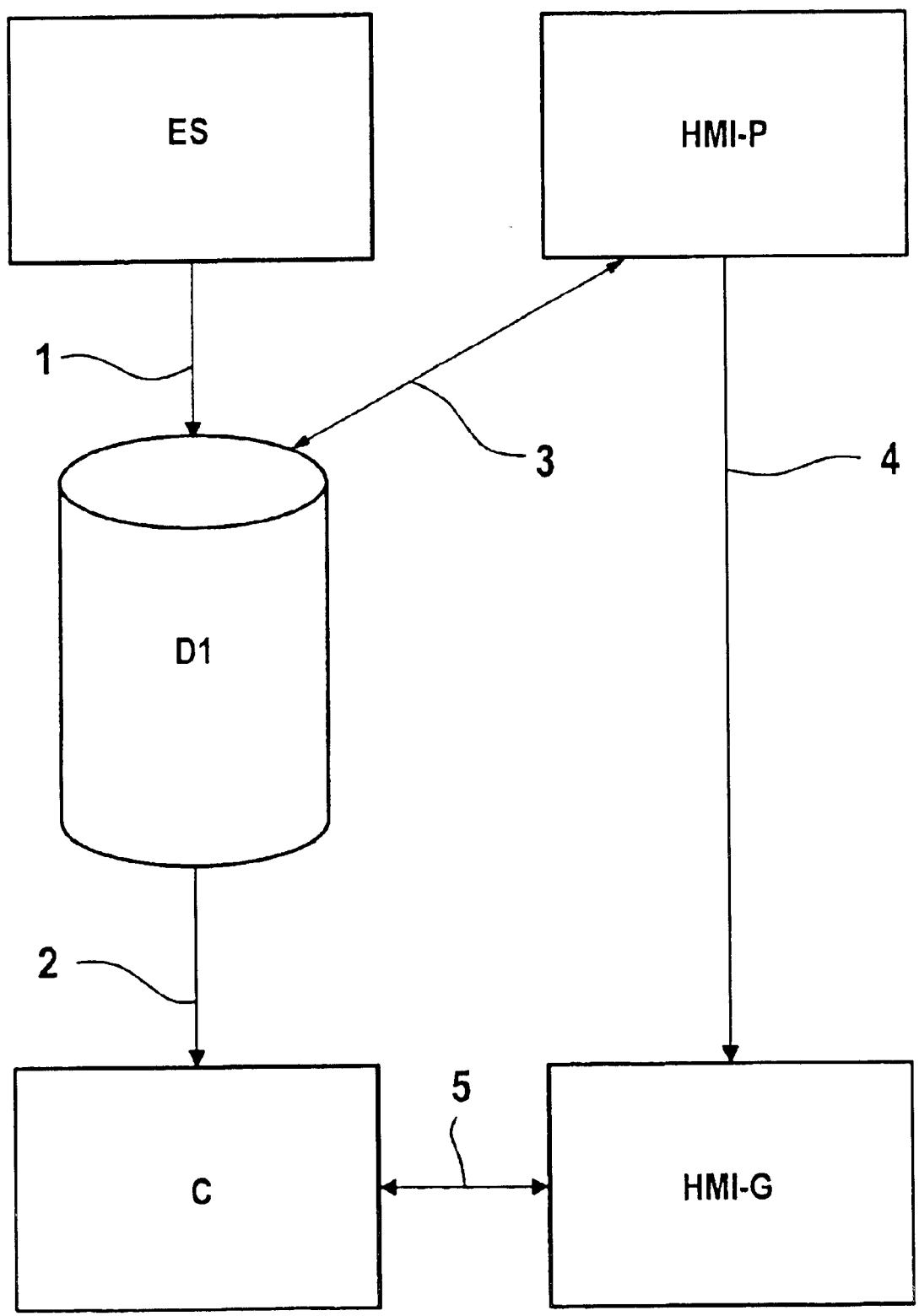

The present invention relates to a method and an apparatus for generating operating components for operating devices of automation components. In particular, the present invention relates to generating a human machine interface (HMI) for controllers and/or a drive.

Complex controllers are designed and programmed with the aid of engineering systems. Control variables are defined and combined in individual engineering steps. The designs resulting therefrom, including the programs, configurations, images, operating and observing variables, etc., are stored in a special database. As required, these data are transferred from the database into the controller and/or the drive.

Operating devices and/or HMI units with the aid of which the controllers can be operated in a user-friendly fashion are frequently provided, not only in the case of complex controllers. The HMI units serve in this case for visualizing and setting relevant control variables.

The generation of HMI surfaces for HMI units requires a special HMI design, the HMI-relevant data from the engineering system, for example images, operating and observing variables, being further processed and, if appropriate, enhanced. The HMI surface thereby produced is loaded into the HMI unit and thereby permits the user to operate the controller and/or the drive as required in practice.

The generation of such HMI surfaces is very complicated, in some circumstances requires knowledge of the data structure of the engineering system, and generally also requires an interface to the data generated by the engineering system. However, in the case of updates of the engineering system and/or the controllers, it is to be ensured that the HMI surfaces are also changed consistently.

The object of the present invention therefore consists in simplifying the generation of HMI surfaces.

According to the invention, this object is achieved by means of a method for generating operating components for operating devices of automation components by means of engineering an automation component by means of a plurality of engineering steps in an engineering system, offering one or more design steps for an operating component in the case of one or more of the engineering steps, and assembling the operating component at least partly with the aid of the design steps and the information on which the engineering steps are based.

The above-named object is also achieved by means of a device for parametrizing, commissioning and programming controllers, having an engineering device for the purpose of providing for an operator the engineering steps relating to parametrization, commissioning and/or programming, the engineering device can be used to set operating components for operating devices of automation components by offering the operator one or more design steps for an operating component in the case of one or more of the engineering steps.

Advantageous developments of the invention follow from the subclaims.

The present invention therefore permits the HMI information also to be generated by simple operating actions or in an automated fashion in normal engineering, it being possible for the technological knowledge present in the engineering system to be used for generating technologically oriented HMI components.

Figure 2:
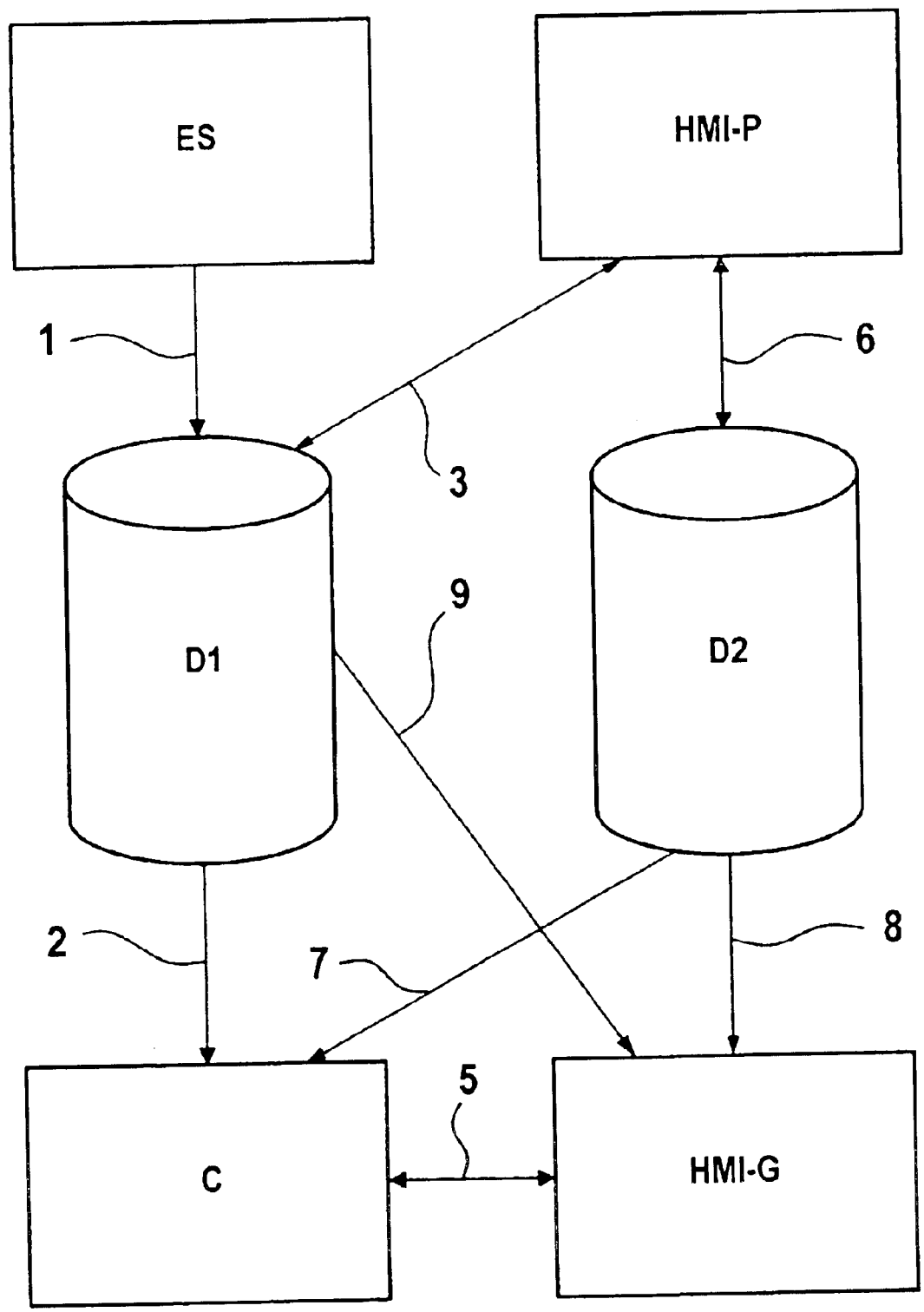

The present invention will now be explained in more detail with the aid of the attached drawings, in which:

FIG. 1 shows a possible configuration of the interconnection, for data processing purposes, of a system according to the invention; and FIG. 2 shows a variant of the configuration of FIG. 1, with a special HMI database.

The exemplary embodiment described below constitutes a preferred embodiment of the present invention.

HMI data for an HMI surface are derived from the normal engineering process in the engineering system. This means that the generation of relevant HMI data is integrated in the operation for commissioning, designing and programming an automation component such that HMI information is also generated by simple operating actions or in an automated fashion in normal engineering. As a result, two processes, the engineering process and the generation process for HMI surfaces, are combined to form one process.

According to the invention, the generation of the HMI data is performed during engineering in the context of the appropriate engineering step. For example, the relevant HMI variables can be determined when commissioning a controller. In this case, individual variables can be marked as HMI-relevant. Furthermore, whole HMI images can be designed or imported during the engineering step.

Relevant HMI variables can be defined as early as when programming automation components. The relevant variables for machine operation or for a servicing image can then be determined when generating the machine application.

It is advantageously possible through the generation of the HMI surface during the engineering operation to make use of the technological knowledge already stored in the engineering system for the purpose of generating technically oriented HMI representations or HMI functionalities. Thus, for example, it is possible for an axial overview to be made available for the HMI surface directly from the engineering system.

The relevant HMI data can be stored optionally in the XML or HTML format or in another format readable to standard Internet clients. This has the advantage that such HMI data or surfaces are also available for external standard tools, thus enhancing the field of application and the flexibility of HMI operating components.

The operator can optionally individually reconfigure an HMI surface in the engineering system. Thus, if desired, the operator can prompt actual data on numbers of items to be faded in on his HMI unit. Moreover, for example the operator can integrate an individual graphic or current camera images of machine parts in the HMI surface.

Furthermore, the functionalities can be operated using standard browsers which can be integrated individually in the HMI unit.

The interconnection of the relevant components for data processing purposes may be explained below with the aid of FIGS. 1 and 2.

FIG. 1 shows an engineering system ES serving the purpose of configuration, programming and commissioning. According to the invention, in addition to the conventional functionalities, the engineering system ES also comprises a functionality for generating HMI surfaces. The data generated by the engineering system ES are stored in a database D1 in accordance with a path 1. In addition to the conventional configuration and program data, in this process special HMI data such as images, operating and observing variables, etc., are also stored in the database 1. The configuration and program data are loaded from the database 1 into a controller or a drive C in accordance with a path 2.

An HMI design tool HMI-P accesses the HMI data of the database D1 via an interface 3. As an alternative to this, the data relevant to HMI can be extracted via an explicit operation (for example exporting). However, the configuration and program data of the engineering system ES are also available for HMI design purposes. The database D1 therefore constitutes a common data bank for the engineering system ES and the HMI design tool HMI-P. However, this also means that data on the HMI design can be stored in or extracted from the database D1 via the import/export interface 3.

After the enhancement and/or further processing of the HMI components, originating in the engineering system ES, in the HMI design tool HMI-P, these data are loaded into an HMI unit HMI-G via a path 4. An HMI surface for operating and observing the controller C is therefore available to the operator. The corresponding data exchange between the HMI unit HMI-G and controller C is performed via a bidirectional fixed or radio link 5.

FIG. 2 illustrates an enlarged configuration of the control system according to the invention. A second database D2 is provided in addition to the system illustrated in FIG. 1. With the exception of the new data paths 6, 7, 8 and 9, the remaining components correspond to those of FIG. 1 with regard to their functionality, as well.

In accordance with FIG. 2, the HMI design tool HMI-P is now capable of storing HMI design data and/or HMI surfaces in the separate database D2, if appropriate in a special format, for example HTML or XML. In addition to supplying the HMI design tool HMI-P via the path 6 with appropriate HMI data, the database D2 can also supply the controller C via a path 7 or the HMI unit HMI-G via a path 8. Moreover, it is possible for the HMI unit HMI-G to tap HMI data directly from the database D1 via a path 9.

The data from the database D1 are therefore available to the HMI unit HMI-G via the following paths:

1. Path 2-5, with intermediate storage of the data in the controller C;
2. Path 3-4, with enhancement or further processing of the data in the HMI design tool HMI-P (compare FIG. 1);
3. Path 3-6-8, with intermediate storage in the second database D2;
4. Path 3-6-7-5 with intermediate storage in the database D2 and in the controller C; and
5. Path 9 as direct tap from the database D1.

The storage of all the HMI data can therefore be performed on the automation component or outside the automation component on an HMI unit or data server.

Operating the functionalities in the HMI unit is favorably performed with the aid of standard browsers.

The following advantages therefore result according to the invention:

the generation of the HMI surfaces is wholly or partly integrated in the engineering of the automation controller/drive, the design steps for the HMI are also offered in the user interface of the individual engineering steps of parametrization, commissioning and programming, entire parts of the HMI are derived from the technological knowledge of the engineering system, for example servicing image with axial overview, diagnostic image for individual axes, diagnostic image for automation component (for example utilization of capacity, memory occupancy, . . . ), optional post-processing/supplementing by means of external tools and/or importation of additional image information, consistency of the HMI images for the purpose of controller design, a consistent HMI design can be generated in an automated fashion (for example by pressing buttons) in the event of updating the system software or application software of the automation component. If, for example, two new variables are added or two are deleted when updating the engineering system, the HMI is automatically adapted to the new number of variables and/or updated.

It may be stated in summary that the generation of the HMI data is integrated according to the invention in the normal engineering system. Consequently, no external further development tool is required for generating the HMI data. As a result, the efficiency and consistency are substantially enhanced in the case of the generation of HMI surfaces.

What is claimed is:

1. A method for generating a human machine interface for an automation component, comprising the steps of:

defining variables for machine operation relevant for said human machine interface;

engineering an automation component by means of one or more of engineering steps in an engineering system, automatically generating and storing data related to said human machine interface during the one or more engineering steps using the previously defined relevant variables, retrieving the stored data during assembly of the human machine interface; and generating he human machine interface with the aid of the retrieved data.

2. The method according to claim 1, including the step of integrating servicing and/or diagnostic images into the human machine interface.

3. The method according to claim 1, further comprising the step of post-processing of the generated data and/or providing of supplemental data by means of external tools and/or importation of additional information, in particular images.

4. The method according to claim 1, further comprising the step of updating of pre-generated data for an existing human machine interface in the event of a change in one or more of the engineering steps.

5. The method according to claim 1, wherein the assembly of the human machine interface is performed automatically on the basis of a determination of relevant variables by an operator in the engineering steps.

6. The method according to claim 1, wherein the data for the human machine interface are generated and stored in a format readable to standard Internet clients, in particular XML or HTML.

7. The method according to claim 1, wherein the data for the human machine interface are stored on an automation component or outside the automation component on the human machine interface or on a data server.

8. A device for parametrizing, commissioning and programming controllers, comprising an engineering device for the purpose of providing for an operator the engineering steps relating to parametrization, commissioning and/or programming, wherein the engineering device can be used to set human machine interface for automation components by defining variables for machine operation relevant for said human machine interface, generating and storing data related to the human machine interface during one or more engineering steps using the previously defined relevant variables.

9. The device according to claim 8, wherein the engineering device can be used to derive for the human machine interface from the engineering steps information or servicing and/or diagnostic images on which the engineering steps are based.

10. The device according to claim 8, wherein the generated data can be post-processed by means of external tools and/or importation of additional information, in particular images.

11. The device according to claim 8, wherein the engineering device has a consistency device with the aid of which it is possible to produce automatically form an existing human machine interface a consistent human machine interface based on changes in one or more engineering steps, in particular in the case of their updating.

12. The device according to claim 8, wherein relevant variables for the human machine interface can be assembled in the engineering device by an operator in the engineering steps.

13. The device according to claim 8, wherein data for the human machine interface can be generated and stored in a format readable to standard Internet clients, in particular XML or HTML.

14. The device according to claim 8, further comprising a data server for storing data of the human machine interface, wherein the data can be accessed by one or more human machine interfaces.

* * * * *